United States Patent Office 3,439,419
Patented Apr. 22, 1969

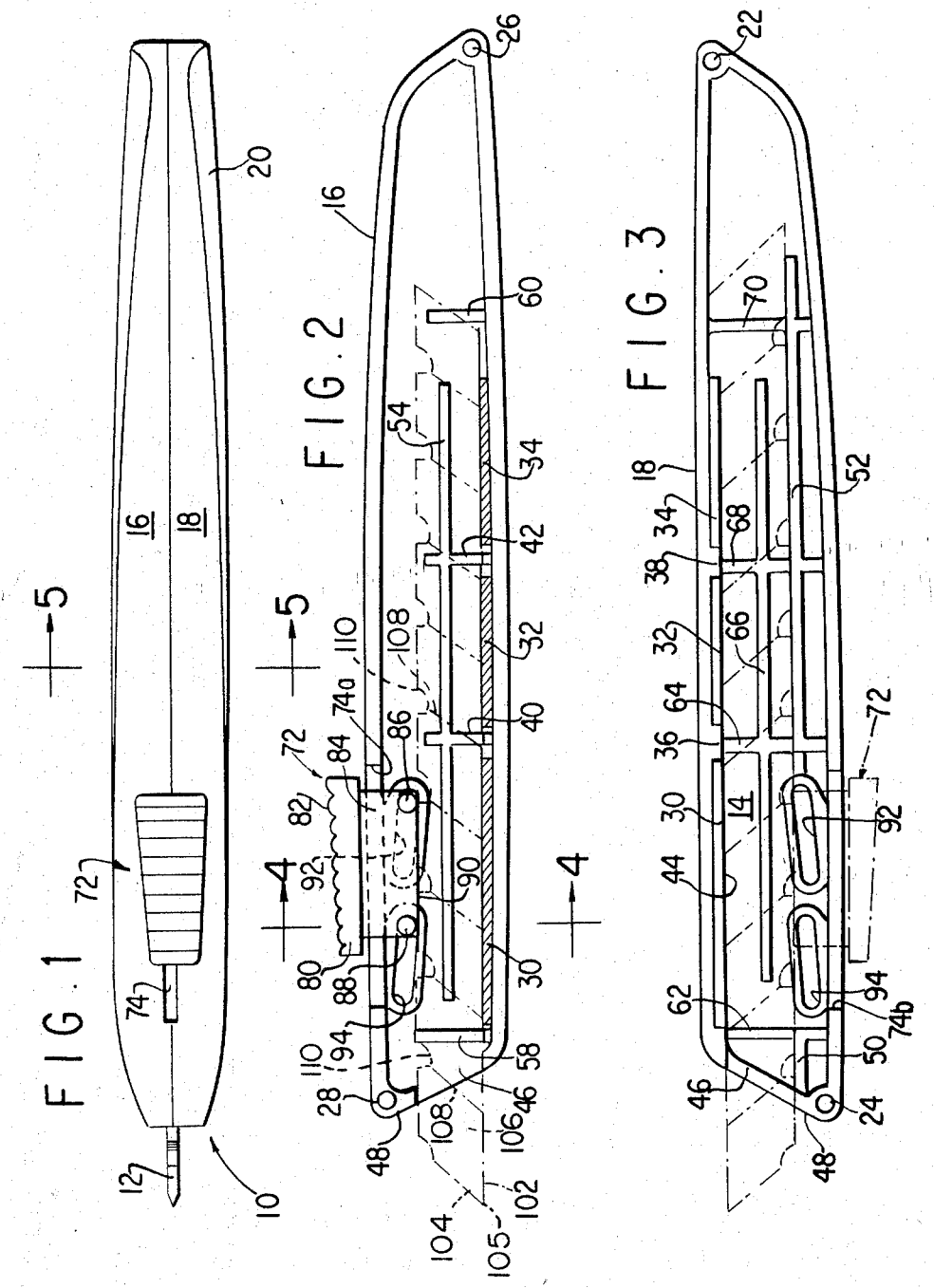

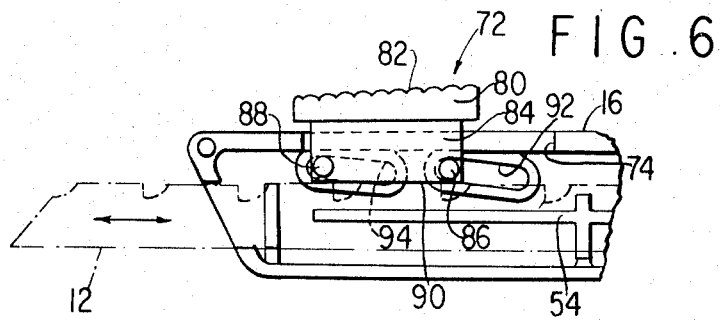
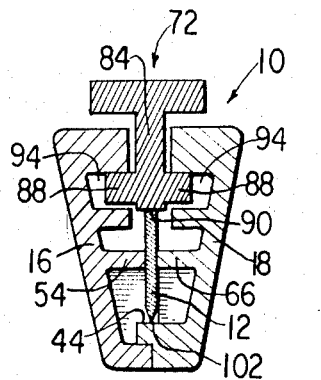
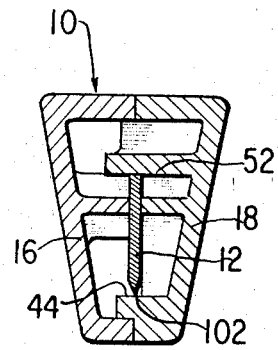
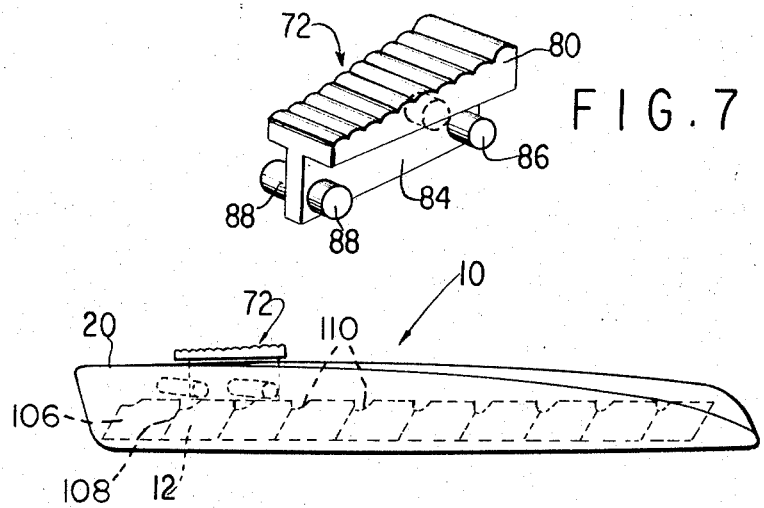

3,439,419
KNIFE WITH SLIDABLE BLADE SHEATHED AND SELECTIVELY CLAMPABLE IN HANDLE
Jack Fairchild Fleming, Boonton, N.J., assignor to Sterling Plastics Company, Mountainside, N.J., a corporation of New Jersey
Filed Dec. 1, 1967, Ser. No. 687,311
Int. Cl. B26b 1/08
U.S. Cl. 30—162                3 Claims

ABSTRACT OF THE DISCLOSURE

A knife handle slidably housing a replaceable pointed cutting blade is constituted by mating molded plastic members joined together to form a blade slideway open at one end of the handle and holding a finger operable clamping member movable to release the blade for free sliding movement to clamp the blade in either a cutting position or a stored position inside the handle. The blade is made in multiple segments to be broken off to form new cutting points.

---

This invention relates to a cutting or scoring knife and more particularly to a new and improved knife handle construction having a multi-point blade replaceably disposed therein.

A principal object of the invention is to provide an improved knife handle construction of the adjustable blade type which is easily and economically manufactured.

Another object of this invention is to provide a knife handle with a storage compartment formed therein for housing a cutting blade slidably within the handle, together with a finger operable member for controlling the position of the cutting blade and securely locking it in either a cutting or a stored position.

The knife of the present invention comprises a handle housing composed of mating molded plastic body members defining a longitudinally disposed slideway or channel therewithin for slidably receiving and supporting a multi-point knife blade. The handle accommodates a finger operable member having a camming action for releasably clamping the blade in an exposed cutting position and for securely storing the blade internally of the handle when it is not being used. The blade is made so that it will serve as an efficient scoring device for a long period of time, being composed of a plurality of breakable cutting segments so that as its cutting point becomes dull a new point readily is produced by breaking off the dull segment and exposing a sharp new cutting segment.

The above and other objects, features and advantages of the invention will be further evident from the following detailed description and the accompanying drawings of an illustrative embodiment thereof. In the drawings:

FIG. 1 is a top plan view of a knife embodying the invention, showing its blade in a cutting position;

FIG. 2 is a side elevational view of the inner side of one of the two body members which form the knife handle, showing in section parts of a blade guide rail projecting from the other body member and showing the cutting blade in broken lines and the blade clamping member in locking position;

FIG. 3 is a side elevational view of the inner side of the other of said body members;

FIG. 4 is a transverse view of the knife handle, taken substantially along the line 4—4 of FIG. 2;

FIG. 5 is a transverse sectional view of the knife handle, taken substantially along the line 5—5 of FIG. 1;

FIG. 6 is a partial side elevational view of the said one body member, showing the blade clamping member in released position enabling free sliding movement of the cutting blade seen in broken lines;

FIG. 7 is a perspective view of the blade clamping member; and

FIG. 8 is a side elevational view of the knife with the cutting blade in stored position inside the handle.

Referring more specifically to the drawings, wherein similar parts are given like reference numerals, there is shown in FIG. 1 an adjustable cutting knife generally designated 10 constructed in accordance with the present invention. The knife 10 includes a cutting blade 12 mounted for sliding movement longitudinally in a slideway or channel 14 provided within an elongated handle 20 which is formed by complementary body members 16 and 18 having a blade clamping member 72 slidably assembled therebetween.

The body members 16 and 18 are each made as a unitary molding of a suitably hard and durable plastic material, or synthetic resin, such as a polystyrene or high density polyethylene injection molded to the required configuration, and they are formed with mating elements for suitably aligning and interlocking them together.

As shown in FIG. 3, the body member 18 is provided near the ends of its inner side with apertured boss portions 22 and 24 for receiving mating pin-like detents 26 and 28, respectively, formed on the body member 16 near the ends of its inner side as illustrated in FIG. 2. When the two members 16 and 18 are brought into assembled relationship, the respective detents and boss portions properly align them for operative use. Although not illustrated in the drawings, it is to be understood that the members 16 and 18 may be secured together along their contacting surfaces, that is their meeting peripheral wall edges, in assembled operative relationship by any suitable means, such as an adhesive, or by the application of sufficient heat and pressure to fuse these surfaces together into a coherent unitary handle body.

Located along the bottom wall of body member 18 is a series of aligned longitudinal flanges 30, 32 and 34 which project laterally beyond the inner edge of that wall so as to protrude into spaces overlying the bottom wall of body member 16 as indicated in FIG. 2, and which are spaced apart one from another by notches 36 and 38. The flanges 30, 32 and 34 form a lower guide rail bridging the medial plane of the handle 20. The upper surface 44 of this rail constitutes the bottom and the knife edge support of the longitudinal channel or slideway 14 provided within the handle.

The notches 36 and 38 assist in the assembly and proper alignment of parts of the handle body by receiving in interfitting relation complementary vertical ribs 40 and 42 formed above the bottom wall of body member 16 as integral parts of that member.

The slideway 14 extends longitudinally inside the handle body 20 through substantially the entire length thereof and opens at the front end 43 thereof through an aperture or slot 46 formed centrally in the front end by recesses molded in the mating front end walls of the body members 16 and 18. The slideway 14 further is defined by longitudinally aligned upper flanges 50 and 52 molded integrally with body member 18 (see FIG. 3), which protrude laterally across the medial plane of the handle into the space within body member 16 to form an upper guide rail overlying the blade, as seen in respect of flange 52 in FIG. 5. The distance between the upper guide rail and the lower guide rail defined by flanges 30, 32 and 34, i.e., the height of the slideway, is slightly greater than the width of the knife blade 12 to be housed in the handle, so that such a blade 12 will be slidably received edgewise between these rails and restrained by them against displacement in the edgewise or vertical direction as viewed in FIG. 5.

The blade is confined against displacement laterally relative to the handle by suitable rib means which form integrally molded parts of the body members and constitute side walls or guides of the slideway disposed adjacent to the opposite sides of the blade 12. Such rib means of the body member 16 include a substantially centrally disposed longitudinal side rib 54 and a plurality of transverse side ribs including ribs 58 and 60 (FIG. 2) disposed near the ends of the handle body and the previously mentioned ribs 40 and 42. The body member 18 similarly is provided with a substantially centrally disposed longitudinal side rib 66 (FIG. 3) and transverse side ribs 62, 64, 68 and 70. The various side ribs, in addition to defining side walls of the slideway, lend rigidity and durability to the mating body members of the handle and enable it securely to hold the blade 12 and to transmit cutting forces applied through it from one's hand to the blade in the use of the assembled knife.

For the latter purpose, however, and for safe storage of the blade 12 entirely within the handle 20 when the knife is not being used, the handle is provided with a finger operable clamping member 72 coacting with elements of the body members 16 and 18 for clamping the blade either in a desired cutting position or in stored position within the handle and for releasing the blade for free sliding movement along the handle from one to another of these positions, or entirely out of the handle for replacement by a new blade, whenever desired.

The clamping member 72 is made as a unitary molding of an elastomeric plastic material, such as a low density polyethylene, which will have suitable rigidity along with degrees of elasticity or resilience and friction suitable for producing a tight gripping engagement with the upper or blunt edge of the knife blade 12. A suitable form of this member is shown in FIG. 7. It comprises an edge clamping vane 84 assembled between the body members 16 and 18 so as to extend through a slot 74 formed in the top wall of the handle 20, and it has a finger knob 80 formed on the vane and disposed above that wall, as shown in FIGS. 1, 2, 4, 6 and 8.

The upper surface of the finger knob 80 is sloped upwardly from the front end to the rear thereof and is transversely knurled as indicated at 82 (FIG. 2), for ease of engagement and movement thereof by the thumb of a hand holding the knife handle. The vane 84 as shown is a substantially rectangular molded body thicker than the upper edge of the knife blade 12, having a substantially flat lower edge 90 to engage against the upper edge of the knife blade. Protruding laterally from the sides of the vane 84 near the backward and forward lower corners thereof are pairs of oppositely extending transverse cam pins 86 and 88, respectively, which are received slidably within backward and forward pairs of sloped cam slots 92 and 94 formed within the body members 16 and 18 at a location near the top and front walls of the handle. The walls of these cam slots slope downwardly at an angle to the longitudinal axis of the handle, hence to the upper edge of a knife blade 12 therein, in the direction away from the front end of the handle, so that when the finger knob 82 is slid forwardly to dispose the pins 86 and 88 at the front ends of the slots, the clamping vane 84 is disposed away from the upper edge of the blade 12 to enable free sliding movement of the blade into and out of the handle, as indicated in FIG. 6, while backward sliding movement of the knob 82 forces the vane 84 backwardly and downwardly into tight non-slipping engagement between its clamping surface 90 and the upper edge of the blade, as indicated in FIGS. 2 and 4. When the blade is thus clamped in any given position, its lower or cutting edge will be pressed against, and often will bite a slight distance into, the surface 44 of the lower guide rail constituted by flanges 30, 32 and 34, so that no longitudinal displacement of the blade relative to the handle will occur unless the blade has been released for such movement by forward and upward sliding movement of the clamping member 72. When the blade has been so released, an upward tilting of the forward end of the knife, if the blade 12 is projecting from the handle, will cause the blade to slide back into the handle 20, whereas a downward tilting of this same end will cause the blade to slide forward through the front end aperture 46. The blade thus slid from the handle to a distance desired for a cutting operation is clamped securely in cutting position by a simple backward movement of the finger knob 80.

In the embodiment shown, (see FIG. 2) the cutting blade 12 comprises an elongated strip of steel or other suitable blade material having its lower edge 102 sharpened for cutting and having its front edge 104 sloped at an acute angle to edge 102 so that the blade will present a sharp pointed end 105 suitable for easily scoring paper or other relatively soft material when the blade is clamped in a cutting position, such as that indicated in FIGS. 1, 2, and 3. Further, as indicated in FIGS. 2 and 6, the blade is subdivided into a plurality of separable cutting segments 106 by being scored diagonally at intervals along one side thereof, as by score lines 108 which are substantially parallel to the sloped front edge 104. These score lines extend across the side of the blade to its cutting edge 102 from notches 110 which are cut out of its upper edge at regular intervals therealone to weaken the blade at the location of each score line. Thus, when the cutting edge or pointed end 105 at the front end of the blade becomes worn or too dull for efficient use, the front segment 106 may be readily broken off along its score line 108 by a suitable force applied transversely to the end of the blade, whereupon a sharp cutting segment having a sharp pointed end will be presented anew by the newly formed front end of the blade.

Various alterations of the structure herein disclosed will suggest themselves to those skilled in the art. The present disclosure sets forth a preferred embodiment of the invention which is for purpose of illustration only and is not to be construed as a limitation of the invention. All modifications of this embodiment which make use of new features herein disclosed are intended to be included within the scope of the appended claims.

What is claimed is:

1. A knife comprising a housing having externally the shape of a handle and forming internally a slideway opening through an end thereof and extending longitudinally thereof to accommodate an elongated knife blade slidable longitudinally therein, one of the longitudinal edges of said blade being a cutting edge, said slideway including a fixed guide rail therealong to support the cutting edge of said blade, a blade clamping member mounted in and for reciprocation longitudinally of said housing adjacent to a portion of said slideway opposite to said guide rail, said member having within said housing a body portion to overlie and engage against the other longitudinal edge of said blade, and having a portion thereof disposed outside said housing whereby said member is movable to and fro longitudinally of said slideway by a finger of a person's hand holding said housing, and coacting cam means on said clamping member and inside said housing for forcing said body portion of said member against said other edge of said blade so as to clamp said cutting edge against said guide rail when said member is moved in one direction longitudinally of said slideway and for displacing said body portion away from said blade so as to release said blade for free displacement along said slideway when said member is moved in the opposite direction, said housing being constituted by two mating body members joined together along a medial longitudinal plane of the housing and having said blade clamping member assembled therebetween, each of said body members being a unitary molding of a thermoplastic resin and said clamping member being a unitary molding of an elastomeric thermoplastic resin.

2. A knife according to claim 1, said cam means comprising pins protruding laterally from opposite sides of said clamping member inside said housing and slots formed on internal portions of said housing and slidably receiving said pins, said slots being defined by confronting wall portions of said housing sloped at an angle to the longitudinal axis of said slideway so as to guide said member into and out of clamping engagement with said opposite edge of said blade.

3. A knife according to claim 1, one of said body members having along the inside thereof integral flanges protruding therefrom across said medial plane into spaces inside the other of said body members so as to constitute upper and lower guide rails for confining said blade against movement edgewise relative to said housing.

References Cited

UNITED STATES PATENTS

| | | | |
|---|---|---|---|
| 317,208 | 5/1885 | Rockwell | 30—163 |
| 2,145,985 | 2/1939 | Krajicek | 30—162 X |
| 2,260,141 | 10/1941 | Hanle | 30—163 |
| 3,025,598 | 3/1962 | Nissen | 30—162 |
| 3,041,724 | 7/1962 | Bobkowski | 30—162 |
| 3,107,426 | 10/1963 | Robinson | 30—162 |
| 3,192,624 | 7/1965 | Gringer | 30—162 |
| 3,316,635 | 5/1967 | Merrow et al. | 30—162 |

MYRON C. KRUSE, *Primary Examiner.*

U.S. Cl. X.R.

30—289